United States Patent
Nishio et al.

(10) Patent No.: US 11,848,775 B2
(45) Date of Patent: *Dec. 19, 2023

(54) COMMUNICATION APPARATUS AND COMMUNICATION METHOD

(71) Applicant: Sun Patent Trust, New York, NY (US)

(72) Inventors: Akihiko Nishio, Osaka (JP); Seigo Nakao, Osaka (JP)

(73) Assignee: Sun Patent Trust, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/150,710

(22) Filed: Jan. 5, 2023

(65) Prior Publication Data

US 2023/0155726 A1 May 18, 2023

Related U.S. Application Data

(63) Continuation of application No. 17/203,445, filed on Mar. 16, 2021, now Pat. No. 11,581,977, which is a
(Continued)

(30) Foreign Application Priority Data

Feb. 15, 2010 (JP) .................................. 2010-030267

(51) Int. Cl.
*H04W 72/04* (2023.01)
*H04L 1/00* (2006.01)
(Continued)

(52) U.S. Cl.
CPC ............ *H04L 1/0047* (2013.01); *H04L 5/001* (2013.01); *H04L 5/0053* (2013.01);
(Continued)

(58) Field of Classification Search
CPC ........... H04W 56/001; H04W 72/0413; H04W 72/046; H04W 74/0833; H04L 41/0668; H04L 5/0048

See application file for complete search history.

(56) References Cited

U.S. PATENT DOCUMENTS 8,233,445 B2  7/2012  Kang et al.
8,359,039 B2 * 1/2013  McBeath .............. H04L 5/0053
                                        370/328
(Continued)

FOREIGN PATENT DOCUMENTS

CN        101047429 A       10/2007
EP       2 312 898 A1        4/2011
(Continued)

OTHER PUBLICATIONS

Panasonic, "PDCCH with cross carrier operation", 3GPP TSG RAN WG1 Meeting#60 R1-101249, (Jan. 22-26, 2010), 7 pages (Year: 2010).*

(Continued)

*Primary Examiner* — Lan-Huong Truong
(74) *Attorney, Agent, or Firm* — Seed IP Law Group LLP

(57) ABSTRACT

Disclosed are a transmission device and a transmission method with which it is possible to prevent delays in data transmission and to minimize the increase in the number of bits necessary for the notification of a CC to be used, in cases where a CC to be used is added during communication employing carrier aggregation. When a component carrier is to be added to a component carrier set, a setting section provided in a base station: modifies a CIF table that defines the correspondence between code points, which are used as labels for the respective component carriers contained in the component carrier set, and the identification information of the respective component carriers; and assigns a vacant code point to the component carrier to be added, while keeping the correspondence between the code points and the component carrier identification information defined in the CIF table before modification.

3 Claims, 10 Drawing Sheets

Related U.S. Application Data continuation of application No. 16/675,823, filed on Nov. 6, 2019, now Pat. No. 10,980,026, which is a continuation of application No. 16/017,881, filed on Jun. 25, 2018, now Pat. No. 10,506,598, which is a continuation of application No. 15/473,482, filed on Mar. 29, 2017, now Pat. No. 10,034,290, which is a continuation of application No. 15/338,204, filed on Oct. 28, 2016, now Pat. No. 9,642,142, which is a continuation of application No. 14/477,501, filed on Sep. 4, 2014, now Pat. No. 9,516,641, which is a continuation of application No. 13/578,505, filed as application No. PCT/JP2011/000796 on Feb. 14, 2011, now Pat. No. 8,855,075.

(51) Int. Cl.
| | | |
|---|---|---|
| H04L 5/00 | (2006.01) | |
| H04L 27/26 | (2006.01) | |
| H04W 72/20 | (2023.01) | |
| H04W 72/23 | (2023.01) | |
| H04W 72/0453 | (2023.01) | |
| H04L 1/1829 | (2023.01) | |

(52) U.S. Cl.
CPC ........ *H04L 5/0096* (2013.01); *H04L 27/2634* (2013.01); *H04W 72/0453* (2013.01); *H04W 72/20* (2023.01); *H04W 72/23* (2023.01); *H04L 1/1829* (2013.01)

(56) References Cited

U.S. PATENT DOCUMENTS

| | | | |
|---|---|---|---|
| 8,385,281 | B2 | 2/2013 | Pan et al. |
| 8,498,261 | B2 | 7/2013 | Kang et al. |
| 8,576,788 | B2 | 11/2013 | Lee et al. |
| 8,634,340 | B2 | 1/2014 | Kuo |
| 8,634,374 | B2 | 1/2014 | Yang et al. |
| 9,351,293 | B2 | 5/2016 | Chen et al. |
| 2009/0154418 | A1 | 6/2009 | Kang et al. |
| 2009/0257387 | A1 | 10/2009 | Gholmieh et al. |
| 2009/0323608 | A1 | 12/2009 | Adachi et al. |
| 2010/0227569 | A1* | 9/2010 | Bala ............... H04W 48/12 455/73 |
| 2011/0080883 | A1 | 4/2011 | Prakash et al. |
| 2011/0134874 | A1 | 6/2011 | Nakao et al. |
| 2011/0141985 | A1* | 6/2011 | Larsson ............ H04L 5/0064 370/329 |
| 2012/0009923 | A1 | 1/2012 | Chen et al. |
| 2012/0087314 | A1 | 4/2012 | Maeda et al. |
| 2012/0243498 | A1 | 9/2012 | Kwon et al. |
| 2012/0243499 | A1 | 9/2012 | Moon et al. |
| 2012/0275422 | A1 | 11/2012 | Kang et al. |

FOREIGN PATENT DOCUMENTS

| | | |
|---|---|---|
| JP | 2010-11397 A | 1/2010 |
| JP | 2010030267 A | 2/2010 |
| JP | 2013513991 A | 4/2013 |
| JP | 2013514713 A | 4/2013 |
| RU | 2007124188 A | 2/2009 |
| WO | WO 2009082160 A1 | 7/2009 |
| WO | 2010/016274 A1 | 2/2010 |
| WO | WO 2010013959 A2 | 2/2010 |
| WO | 2010/146835 A1 | 12/2010 |

OTHER PUBLICATIONS

Alcatel-Lucent et al., "Way Forward on details of CIF," R1-100821, Agenda item: 7.1.4, 3GPP TSG RAN WG1 Meeting #59bis, Valencia, Spain, Jan. 18-22, 2010. (2 pages).

Alcatel-Lucent et al., "Way Forward on PDCCH for Bandwidth Extension in LTE-A," R1-093699, 3GPP TSG RAN WG1 Meeting #58, Shenzhen, China, Aug. 24-28, 2009. (2 pages).
Catt, "Consideration on Component Carrier Index," R2-100060, Agenda Item: 7.1.2, 3GPP TSG RAN WG2 meeting #68bis, Valencia, Spain, Jan. 18-22, 2010. (3 pages).
LG Electronics Inc., "Consideration on CI-to-CC Reconfiguration," R1-102715, Agenda Item: 6.2.3.4 Other, TSG-RAN WG1 Meeting #61, Montreal, Canada, May 10-14, 2010. (2 pages).
LG Electronics, "Carrier indicator field related issues for cross-carrier scheduling in multiple carrier aggregation," R1-100213, Agenda Item: 7.1.4, 3GPP TSG RAN WG1 #59b, Valencia, Spain, Jan. 18-22, 2010. (5 pages).
Motorola, "PDCCH Design for Cross-Carrier Operation Using CIF," R1-094830, Agenda item: 7.2.1.1, 3GPP TSG RAN WG1 Meeting #59, Jeju, Korea, Nov. 9-13, 2009. (3 pages).
Panasonic, "Further discussion on PDCCH with cross carrier operation," R1-100361, Agenda Item: 7.1.4, 3GPP TSG-RAN WG1 Meeting #59bis, Valencia, Spain, Jan. 18-22, 2010. (6 pages).
Qualcomm Europe, "Interpreting the Carrier Indicator Field," R1-094206, Agenda item: 7.2.2.3, 3GPP TSG RAN WG1 #58bis, Miyazaki, Japan, Oct. 12-16, 2009. (3 pages).
Qualcomm Europe, "Interpreting the Carrier Indicator Field," R1-094862, Agenda item: 7.2.1.1, 3GPP TSG RAN WG1 #59, Jeju, Korea, Nov. 9-13, 2009. (4 pages).
Qualcomm Incorporated, "Interpreting the Carrier Indicator Field," R1-100673, Agenda Item: 7.1.4, 3GPP TSG RAN WG1 #59bis, Valencia, Spain, Jan. 18-22, 2010. (3 pages).
Texas Instruments, "PDCCH Carrier Indication Field for Cros-Carrier Scheduling," R1-094761, Agenda Item: 7.2.1.1, 3GPP TSG RAN WG1 #59, Jeju, Korea, Nov. 9-13, 2009. (4 pages).
"3rd Generation Partnership Project; Technical Specification Group Radio Access Network; Evolved Universal Terrestrial Radio Access (E-UTRA); Physical Channels and Modulation (Release 8)," Technical Specification, 3GPP TS 36.211 V8.3.0, May 2008, 77 pages.
"3rd Generation Partnership Project; Technical Specification Group Radio Access Network; Evolved Universal Terrestrial Radio Access (E-UTRA); Multiplexing and channel coding (Release 8)," Technical Specification, 3GPP TS 36.212 V8.3.0, May 2008, 48 pages.
"3rd Generation Partnership Project; Technical Specification Group Radio Access Network; Evolved Universal Terrestrial Radio Access (E-UTRA); Physical layer procedures (Release 8)," Technical Specification, 3GPP TS 36.213 V8.3.0, May 2008, 45 pages.
"3rd Generation Partnership Project; Technical Specification Group Radio Access Network; Evolved Universal Terrestrial Radio Access (E-UTRA); Radio Resource Control (RRC); Protocol specification (Release 8)," Technical Specification, 3GPP TS 36.331 V8.7.0, Sep. 2009, 208 pages.
English Translation of Chinese Search Report dated Jul. 30, 2014, for corresponding CN Application No. 201180009291.5, 2 pages.
Ericsson, ST-Ericsson, "Mapping of CIF to component carriers," R1-100041, Agenda Item: 7.1.4, 3GPP TSG RAN WG1 Meeting #59bis, Valencia, Spain, Jan. 18-22, 2010, 4 pages.
International Search Report, dated May 17, 2011, for corresponding International Application No. PCT/JP2011/000796, 2 pages.
Panasonic, "PDCCH with cross carrier operation," R1-101249, Agenda Item: 7.1.3, 3GPP TSG-RAN WG1 Meeting #60, San Francisco, USA, Jan. 22-26, 2010, 7 pages.
Panasonic, "PCFICH in cross carrier operation," R1-100360, Agenda Item: 7.1.2, 3GPP TSG-RAN WG1 #59bis, Valencia, Spain, Jan. 18-22, 2010, 4 pages.
Catt, CMCC, "Consideration on Component Carrier Index," R2-101051, 3GPP TSG RAN WG2 Meeting #69, Agenda Item: 7.1.2, San Francisco, USA, Feb. 22-26, 2010, 3 pages.
Extended European Search Report, dated Jul. 24, 2017, for corresponding European Application No. 11742055.4-1870 / 2538715, 8 pages.
HTC Corporation, "Carrier Indication and CIF in PDCCH," R1-100546, 3GPP TSG RAN WG1 Meeting #59bis, Agenda Item: 7.1.4, Valencia, Spain, Jan. 28-22, 2010, 2 pages.

* cited by examiner

| CIF VALUE | CC INDEX |
|---|---|
| 1 | 2 |
| 2 | — |
| 3 | — |
| 4 | — |

FIG.5A

| CIF VALUE | CC INDEX |
|---|---|
| 1 | 2 |
| 2 | 3 |
| 3 | — |
| 4 | — |

FIG.5B

| CIF VALUE | CC INDEX |
|---|---|
| 1 | 2 |
| 2 | 3 |
| 3 | 1 |
| 4 | — |

FIG.5C

| CIF VALUE | CC INDEX |
|---|---|
| 1 | 2 |
| 2 | 3 |
| 3 | — |
| 4 | — |

FIG.5D

| CIF VALUE | CC INDEX |
|---|---|
| 1 | 2 |
| 2 | 3 |
| 3 | 4 |
| 4 | — |

FIG.5E

| CIF VALUE | CC INDEX | CFI VALUE |
|---|---|---|
| 1 | 2 | NA |
| 2 | 3 | 1 |
| 3 | 3 | 2 |
| 4 | 3 | 3 |
| 5 | — | — |
| 6 | — | — |
| 7 | — | — |
| 8 | — | — |

UE CC SET: CC2, CC3

FIG.6A

ADD CC1
CIF CODE POINT: 5, 6, 7

| CIF VALUE | CC INDEX | CFI VALUE |
|---|---|---|
| 1 | 2 | NA |
| 2 | 3 | 1 |
| 3 | 3 | 2 |
| 4 | 3 | 3 |
| 5 | 1 | 1 |
| 6 | 1 | 2 |
| 7 | 1 | 3 |
| 8 | — | — |

UE CC SET: CC1, CC2, CC3

FIG.6B

ADD CC4
CIF CODE POINT: 4, 8

| CIF VALUE | CC INDEX | CFI VALUE |
|---|---|---|
| 1 | 2 | NA |
| 2 | 3 | 1 |
| 3 | 3 | 2 |
| 4 | 4 | 1 |
| 5 | 1 | 1 |
| 6 | 1 | 2 |
| 7 | 1 | 3 |
| 8 | 4 | 2 |

UE CC SET: CC1, CC2, CC3, CC4

OVERWRITE

FIG.6C

FOR THREE CIF CODE POINTS ALLOCATION

| NUMBER OF ALLOCATION CIFs | x | y | z |

⇨ CFI=1   ⇨ CFI=2   ⇨ CFI=3

FOR TWO CIF CODE POINTS ALLOCATION

| NUMBER OF ALLOCATION CIFs | x | y |

⇨ CFI=1   ⇨ CFI=2

FOR ONE CIF CODE POINT ALLOCATION

| NUMBER OF ALLOCATION CIFs | x |

⇨ CFI=1

SEPARATELY REPORT WHICH CFI WILL BE USED

TABLE FORMAT 1

| CIF VALUE | CC INDEX | CFI VALUE | |
|---|---|---|---|
| | SAME CC | NA | |
| 1 | | | |
| 2 | a | 1 | ⎫ SUBSET 1 |
| 3 | a | 2 | |
| 4 | a | 3 | ⎭ |
| 5 | b | 1 | ⎫ SUBSET 2 |
| 6 | b | 2 | |
| 7 | b | 3 | |
| 8 | — | — | ⎭ |

TABLE FORMAT 2

| CIF VALUE | CC INDEX | CFI VALUE | |
|---|---|---|---|
| | SAME CC | NA | |
| 1 | | | |
| 2 | a | 1 | ⎫ SUBSET 1 |
| 3 | a | 2 | ⎭ |
| 4 | b | 1 | ⎫ SUBSET 2 |
| 5 | b | 2 | ⎭ |
| 6 | c | 1 | ⎫ SUBSET 3 |
| 7 | c | 2 | ⎭ |
| 8 | d | 2 | } SUBSET 4 |

TABLE FORMAT 3

| CIF VALUE | CC INDEX | CFI VALUE | |
|---|---|---|---|
| | SAME CC | NA | |
| 1 | | | |
| 2 | a | 2 | ⎫ SUBSET 1 |
| 3 | a | 3 | ⎭ |
| 4 | b | 2 | ⎫ SUBSET 2 |
| 5 | b | 3 | ⎭ |
| 6 | c | 2 | ⎫ SUBSET 3 |
| 7 | c | 3 | ⎭ |
| 8 | d | 3 | } SUBSET 4 |

TABLE FORMAT 4

| CIF VALUE | CC INDEX | CFI VALUE | |
|---|---|---|---|
| | SAME CC | NA | |
| 1 | | | |
| 2 | a | 1 | ⎫ SUBSET 1 |
| 3 | a | 3 | ⎭ |
| 4 | b | 1 | ⎫ SUBSET 2 |
| 5 | b | 3 | ⎭ |
| 6 | c | 1 | ⎫ SUBSET 3 |
| 7 | c | 3 | ⎭ |
| 8 | d | 3 | } SUBSET 4 |

FIG.9

TABLE FORMAT 5

| CIF VALUE | CC INDEX<br>SAME CC | CFI VALUE<br>NA | |
|---|---|---|---|
| 1 | | | |
| 2 | a | 1 | } SUBSET 1 |
| 3 | a | 2 | |
| 4 | b | 2 | } SUBSET 2 |
| 5 | b | 3 | |
| 6 | c | 1 | } SUBSET 3 |
| 7 | c | 3 | |
| 8 | d | 3 | } SUBSET 4 |

FIG.10

COMMUNICATION APPARATUS AND COMMUNICATION METHOD

TECHNICAL FIELD

The present invention relates to a transmission apparatus and a transmission method.

BACKGROUND ART

3GPP-LTE (3rd Generation Partnership Project Radio Access Network Long Term Evolution, hereinafter referred to as "LTE") adopts OFDMA (Orthogonal Frequency Division Multiple Access) as a downlink communication scheme, and SC-FDMA (Single Carrier Frequency Division Multiple Access) as an uplink communication scheme (e.g., see non-patent literatures 1, 2 and 3).

In LTE, a radio communication base station apparatus (hereinafter abbreviated as "base station") communicates with radio communication terminal apparatuses (hereinafter abbreviated as "terminals") by allocating resource blocks (RBs) in a system band to terminals, per time unit referred to as a subframe. In addition, the base station transmits to the terminals the control information (resource allocation information) to notify the terminals of the result of resource allocation of downlink data and uplink data. This control information is transmitted to the terminals using downlink control channels such as PDCCHs (Physical Downlink Control Channels). Here, according to, for example, an allocation number of terminals, the base station controls the amount of resources used in transmission of the PDCCHs, that is, the number of OFDM symbols on a subframe unit basis. To be more specific, the base station transmits to the terminals using a PCFICH (Physical Control Format Indicator Channel), the CFI (Control Format Indicator), which is the information indicating the number of OFDM symbols capable of being used in transmission of the PDCCHs in the first OFDM symbols of the subframes. Each of terminals receives the PDCCH in accordance with the CFI detected from the received PCFICH. Here, each PDCCH occupies a resource formed of one or a plurality of consecutive CCEs (Control Channel Elements). In LTE, according to the number of information bits of the control information or the channel state of the terminal, one of 1, 2, 4, and 8 is selected as the number of CCEs occupied by the PDCCH (the number of linked CCEs: CCE aggregation level). Here, LTE supports the frequency band with the maximum width of 20 MHz as a system bandwidth.

In addition, the base station simultaneously transmits a plurality of PDCCHs to allocate a plurality of terminals to one subframe. At this time, in order to identify the destination terminal of each of the PDCCHs, the base station includes a CRC bit masked (or scrambled) with the ID of the destination terminal in the PDCCH for transmission. Then, the terminal detects the PDCCH addressed to the terminal by performing blind decoding on a plurality of PDCCHs which may be addressed to the terminal, by demasking (or descrambling) CRC bits using its own terminal ID.

Furthermore, studies have been underway for a technique to limit the CCE to be the target of blind decoding every terminal, for the purpose of reducing the number of blind decoding attempts at the terminal. This technique limits the CCE area (hereinafter, referred to as "search space") to be the target of the blind decoding every terminal. In LTE, the search space is randomly formed every terminal, and the number of CCEs forming the search space is defined every CCE aggregation level of the PDCCH. For example, for CCE aggregation levels 1, 2, 4, and 8, the numbers of CCEs forming the search spaces—that is, the numbers of CCEs to be the targets of the blind decoding—are limited to six candidates (6 (=1×6) CCEs), six candidates (12 (=2×6) CCEs), two candidates (8 (=4×2) CCEs), and two candidates (16 (=8×2) CCEs), respectively. Thus, each terminal needs to perform blind decoding only on the CCEs in the search space allocated to the terminal, thus making it possible to reduce the number of blind decoding attempts. Here, the search space of each terminal is configured using the terminal ID of each terminal and a hash function for randomization.

Also, LTE adopts ARQ (Automatic Repeat reQuest) for downlink data from the base station to the terminals. That is, each of the terminals sends a response signal indicating the error detection result of downlink data to the base station as a feedback. The terminal performs a CRC on the downlink data, and then, transmits a response signal (that is, ACK/NACK signal) indicating an ACK (Acknowledgement) in case of CRC=OK (no error) or a NACK (Negative Acknowledgement) in case of CRC=NG (error exists) as a feed back to the base station. When the response signal transmitted as a feedback indicates the NACK, the base station transmits retransmission data to the terminal. Moreover, in LTE, the control technique for retransmitting data, referred to as HARQ (Hybrid ARQ), which combines error correction coding and ARQ, has been examined. In HARQ, when receiving retransmitted data, the terminal can improve reception quality at the terminal side by combining the retransmitted data and the previously-received data including an error.

Moreover, standardization of 3GPP LTE-Advanced (hereinafter referred to as "LTE-A") to realize faster communication than the LTE has been started. In LTE-A, in order to realize the downlink transmission speed equal to or higher than the maximum 1 Gbps and the uplink transmission speed equal to or higher than the maximum 500 Mbps, it is expected to introduce base stations and terminals (hereinafter referred to as "LTE-A terminals") capable of communicating with each other at the wideband frequency equal to or higher than 40 MHz. In addition, an LTE-Advanced system is required to accommodate not only LTE-A terminals but also the terminals supporting an LTE system (hereinafter referred to as "LTE terminals").

In LTE-A, the carrier aggregation scheme whereby communication is performed by aggregating a plurality of frequency bands has been proposed to realize wideband communication of 40 MHz or above (e.g., see non-patent literature 1). For example, the frequency band having a width of 20 MHz is defined as the base unit (hereinafter referred to as "component carrier (CC)") of communication bands. Thus, LTE-A realizes the system bandwidth of 40 MHz by aggregating two component carriers. Also, a single component carrier accommodates both an LTE terminal and an LTE-A terminal. Additionally, in the following explanation, the component carrier in an uplink is referred to as "uplink component carrier", and the component carrier in a downlink is referred to as "downlink component carrier."

While it has been studied to support the carrier aggregation by at least five component carriers in the LTE-A system, the number of actually used component carriers differs every terminal according to, for example, a required transmission rate and the reception capability of each terminal with the number of component carriers. Here, which component carrier to be used is configured every terminal. The configured component carrier is referred to as "UE CC set." The UE CC set is semi-statically controlled by the required transmission rate of the terminal.

In LTE-A, as a method to notify terminals of the resource allocation information of each component carrier from a base station, it has been discussed to allocate data of different component carriers by a PDCCH transmitted using a certain component carrier (e.g., see non-patent literature 4). In particular, studies have been underway to indicate the component carrier which is the allocation target of the PDCCH by using a carrier indicator (CI) in the PDCCH. That is, the CI labels each component carrier. The CI is transmitted in a field inside of the PDCCH, referred to as "carrier indicator field (CIF)."

Also, it has been considered to report the CIF value of the component carrier which is the allocation target, in addition to the CI in the CIF (e.g., see non-patent literature 5).

Also, the above non-patent literature 4 discloses the correspondence between a CI value (that is, a code point) and the CC number indicated by the CI value. That is, when the same CC as the CC which has transmitted a PDCCH is allocated, CI=1 (when CI starts from 1) is allocated. CI values are associated in ascending frequency order with other CCs. For example, as illustrated in FIG. 1B, when there are three CCs (CC1, CC2, and CC3 in ascending frequency order) and all three CCs are configured to a terminal (that is, when a UE CC set includes CC1, CC2, and CC3), in the PDCCH transmitted in CC2, CI=1 indicates data allocation of CC2, CI=2 indicates the data allocation of CC1, and CI=3 indicates the data allocation of CC3. Meanwhile, as illustrated in FIG. 1A, two out of three CCs are configured to the terminal (for example, when a UE CC set includes CC2 and CC3), CI=1 indicates the data allocation of CC2 and CI=2 indicates the data allocation of CC3. In this case, every time the CC configuration of each terminal (that is, the UE CC set) is changed, the correspondence between the CIs and the CC numbers varies, the CIs being other than the CI allocating the same CC. In the above example, when CC1 is added to the UE CC set in the terminal for which CC2 and CC3 are configured, the code point of the CI allocating CC3 varies before and after adding the CC.

Here, use of RRC signaling described in non-patent literature 6 to change the UE CC set (that is, addition and deletion of a CC), for example, has been considered. To be more specific, an RRC connection reconfiguration procedure is used to change the UE CC set. In case of changing a UE CC set, a base station firstly transmits an RRC connection reconfiguration message to a terminal to notify the terminal of the change. The terminal receiving this message changes its configuration, and then, after the change is completed, and sends an RRC connection reconfiguration complete message to the base station. By receiving the RRC connection reconfiguration complete message, the base station learns that the configuration change has been correctly made in the terminal. Here, it normally takes several 10 to 100 ms to communicate these messages with each other.

CITATION LIST

Non-Patent Literature

NPL 1
3GPP TS 36.211 V8.3.0, "Physical Channels and Modulation (Release 8)," May 2008
NPL 2
3GPP TS 36.212 V8.3.0, "Multiplexing and channel coding (Release 8)," May 2008
NPL 3
3GPP TS 36.213 V8.3.0, "Physical layer procedures (Release 8)," May 2008
NPL 4
3GPP TSG RAN WG1 meeting, R1-100041, "Mapping of CIF to component carrier" January 2010
NPL 5
3GPP TSG RAN WG1 meeting, R1-100360, "PCFICH in cross carrier operation" January 2010
NPL 6
3GPP TS 36.331 V8.7.0 "Radio Resource Control (RRC)", (2009-09)

SUMMARY OF INVENTION

Technical Problem

However, according to the correspondence between the CIs and the CC numbers in the above non-patent literature 4, the addition of a CC varies the correspondence between the CI code points and the CCs. For this reason, during the above RRC connection reconfiguration procedure (that is, a period from transmission of an RRC connection reconfiguration message from the base station to reception of an RRC connection reconfiguration complete message), the base station cannot allocate a CC other than the CC used to transmit the PDCCH (CC2 in the above example). To put it differently, even though the CC is added for the purpose of increasing the amount of data to be transmitted, for example, it is impossible to allocate data not only to the CC to be newly added (in the above example, CC2) but also to the CC in use (CC3), until the above reconfiguration is completed. As a result, a delay in data transmission occurs.

On the other hand, when the correspondence between the CIs and the CC numbers are fixed, the above mentioned problem of the delay in the data transmission does not occur. For example, when CI=1, CI=2, and CI=3 are fixedly associated with CC1, CC2 and CC3, respectively, no change occurs in the correspondence. However, in this case, the number of code points (for example, 3 bits in the system of eight CCs) corresponding to the total number of CCs in the system is required for notification of the CCs, regardless of the number of CCs configured to the terminal. As a result, the number of CIF bits increases. For example, it is always required to use 3 bits for notification, even for allocation of four CCs (representable by 2 bits) every terminal. In other words, the number of CCs supportable by the system is limited by the number of CIF bits in this case.

It is therefore an object of the present invention to provide a transmission apparatus and a transmission method capable of preventing, when adding a CC to be used in carrier aggregation communication, a delay in data transmission while suppressing an increase in the number of bits required for notification of the CCs in use.

Solution to Problem

A transmission apparatus according to one aspect of the present invention transmits data by a component carrier set including a plurality of component carriers, the transmission apparatus includes: a configuration section that corrects, when a component carrier is added to the component carrier set, a labeling rule associating an identification information piece of a component carrier with a code point used as a label of the component carrier used for transmitting the data, the configuration section allocating an unused code point to the component carrier to be added, while maintaining a correspondence between the identification information piece of the component carrier and the code point according to the labeling rule before correction is made; a formation section that forms a control signal for data transmission using each of the plurality of component carriers, the control signal of each of the component carriers being labeled by a code point according to the labeling rule corrected by the configuration section; and a transmission section that transmits a notification signal including information about the correction of the labeling rule to a reception side of the data.

A transmission method according to an aspect of the present invention transmits data by a component carrier set including a plurality of component carriers, the transmission method includes: a configuration step of correcting, when a component carrier is added to the component carrier set, a labeling rule associating an identification information piece of a component carrier with a code point used as a label of the component carrier transmitting the data, the configuration step allocating an unused code point to the component carrier to be added, while maintaining a correspondence between the identification information piece of the component carrier and the code point according to the labeling rule before correction is made; a forming step of forming a control signal for data transmission using each of the plurality of component carriers, the control signal of each of the component carriers being labeled by a code point according to the labeling rule corrected in the configuration step; and a transmission step of transmitting a notification signal including information about the correction of the labeling rule to a reception side of the data.

Advantageous Effects of Invention

According to the present invention, it is possible to provide the transmission apparatus and the transmission method capable of preventing, when adding a CC to be used in carrier aggregation communication, a delay in data transmission while suppressing an increase in the number of bits required for notification of the CCs in use.

BRIEF DESCRIPTION OF DRAWINGS

FIGS. 5A, 5B, 5C, 5D, and 5E illustrate operation of the base station and the terminal;
FIGS. 6A, 6B, and 6C illustrate operation of a base station and a terminal according to Embodiment 2 of the present invention;
FIG. 7 illustrates notification formats;
FIG. 8 illustrates variation 1;
FIG. 9 illustrates CIF table formats according to Embodiment 3 of the present invention;
and
FIG. 10 illustrates a CIF table format according to Embodiment 3 of the present invention.

DESCRIPTION OF EMBODIMENT

Figure 1A:
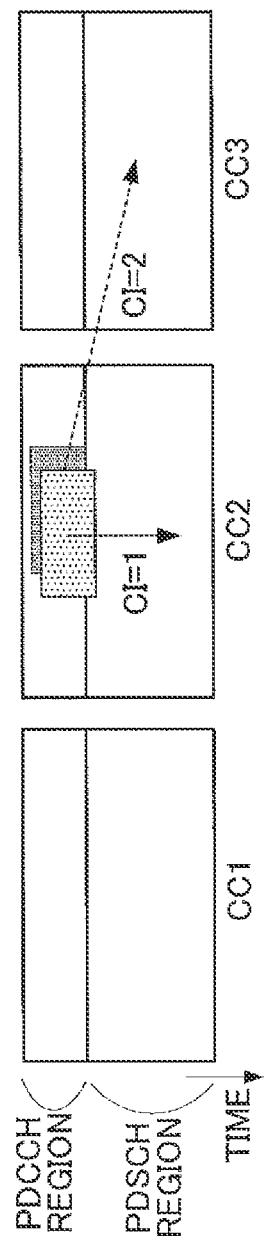
FIGS. 1A and 1B illustrate a conventional labeling technique.
Figure 1B:
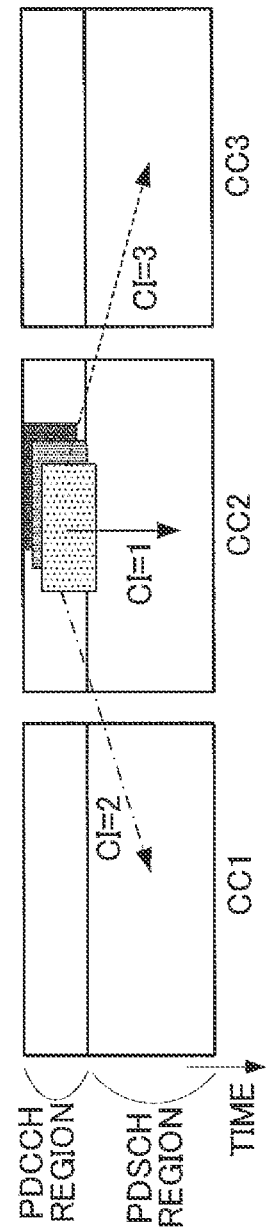

Now, embodiments of the present invention will be explained in detail with reference to the accompanying drawings. Here, in embodiments, the same components are denoted by the same reference numerals and their overlapping explanations are omitted.

Embodiment 11

Figure 2:
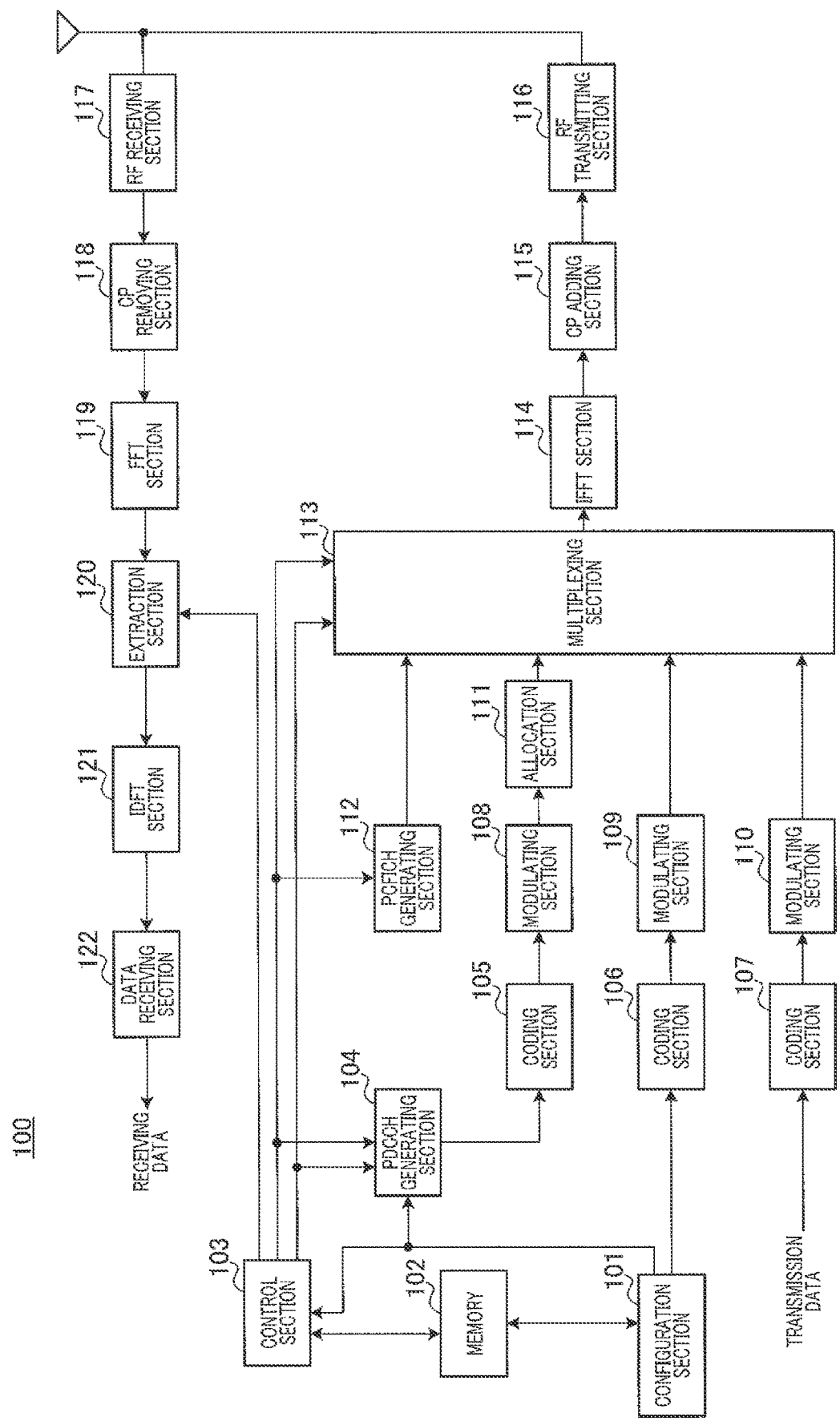
FIG. 2 is a block diagram illustrating a configuration of a base station according to Embodiment 1 of the present invention.

[Base Station Configuration]
FIG. 2 is a block diagram illustrating a configuration of base station 100 according to Embodiment 1 of the present invention. In FIG. 2, base station 100 includes configuration section 101, memory 102, control section 103, PDCCH generating section 104, coding sections 105, 106, and 107, modulating sections 108, 109, and 110, allocation section 111, PCFICH generating section 112, multiplexing section 113, IFFT (Inverse Fast Fourier Transform) section 114, CP (Cyclic Prefix) adding section 115, RF transmitting section 116, RF receiving section 117, CP removing section 118, FFT (Fast Fourier Transform) section 119, extraction section 120, IDFT (Inverse Discrete Fourier Transform) section 121, and data receiving section 122.

Configuration section 101 configures one or a plurality of CCs used for uplink and downlink, for each terminal, that is, configures a UE CC set. This UE CC set is configured according to, for example, a required transmission rate of each terminal, the data amount to be transmitted in a transmission buffer, the tolerable amount of delay, and QoS (Quality of Service). Configuration section 101 also changes the UE CC set once configured.

When initially configuring the UE CC set and every time changing the UE CC set, configuration section 101 corrects (updates) a CIF table (that is, a labeling rule) stored in memory 102. In this CIF table stored in memory 102, CCs forming the UE CC set are associated with code points of the CIFs, respectively.

To be more specific, when adding a new CC to the UE CC set, configuration section 101 adds the new CC, while maintaining the CCs forming the currently configured UE CC set. Also, when correcting the CIF table, configuration section 101 allocates a currently unused CIF code point to the added CC, while maintaining the relationship between the CIF code points and the CCs forming the currently configured UE CC set. In addition, configuration section 101 also allocates the CC number (hereinafter, this number may be simply referred to as "PDCCH CC number") used to transmit a PDCCH signal including the resource allocation information related to data transmitted by the added CC. When deleting a CC from the CCs forming the UE CC set, configuration section 101 deletes only the CC, while maintaining the correspondence between the CIF code points and the undeleted CCs. The details of this CIF table and the correction process of the CIF table will be described later.

When changing the UE CC set, configuration section 101 notifies later described terminal 200 of the following information via a process system going through coding section 106. That is, when adding a CC, configuration section 101 notifies terminal 200 of the CC number to be added, the PDCCH CC number, and the CIF code point allocated to the CC to be added, to terminal 200. Meanwhile, when deleting a CC, configuration section 101 notifies terminal 200 of the CC number to be deleted. The above configuration is used relatively in a long span. That is, the configuration is not changed on a subframe unit basis.

When initially configuring the UE CC set and every time changing the UE CC set, configuration section 101 outputs the CC numbers and the PDCCH CC numbers forming the UE CC set, to control section 103 and PDCCH generating section 104. Hereinafter, the pieces of information output from configuration section 101 may be collectively referred to as "configuration information."

Control section 103 generates the resource allocation information (that is, uplink resource allocation information and downlink resource allocation information). The uplink resource allocation information represents an uplink resource (for example, PUSCH) to which uplink data of allocation-target terminal 200 is allocated. Meanwhile, the downlink resource allocation information represents a downlink resource (for example, PDSCH) to which downlink data addressed to allocation-target terminal 200 is allocated. Here, the resource allocation information includes: the allocation information of a resource block (RB); the MCS information of data; the information relating to HARQ retransmission such as the information (NDI: New Data Indicator) or the RV (Redundancy Version) information which indicates whether the data is new or retransmission data; the information (CI: Carrier Indicator) of the CC subject to the resource allocation; and the CFI information of the allocation-target CC.

Control section 103 outputs the resource allocation information to PDCCH generating section 104 and multiplexing section 113.

Here, based on the configuration information received from configuration section 101, control section 103 allocates the resource allocation information for allocation-target terminal 200, to the PDCCH arranged in the downlink component carrier configured in corresponding terminal 200. This allocation process is allocated on a subframe unit basis. In particular, control section 103 allocates the resource allocation information for allocation-target terminal 200, to the PDCCH arranged in the downlink component carrier indicated by the PDCCH CC number configured in the terminal 200. Control section 103 allocates a CIF code point to each CC subject to the resource allocation, according to the CIF table updated by configuration section 101. A PDCCH is formed by one or a plurality of CCEs. Furthermore, the number of CCEs used by base station 100 is configured based on the propagation path quality (CQI: Channel Quality Indicator) and the control information size of allocation-target terminal 200. By this means, terminal 200 can receive control information at a necessary and sufficient error rate.

Control section 103 determines the number of OFDM symbols used to transmit the PDCCH every downlink component carrier, based on the number of CCEs used to transmit the PDCCH. Control section 103 generates the CFI information indicating the determined number of the OFDM symbols. Then, control section 103 outputs the CFI information for each downlink component carrier, to PCFICH generating section 112 and multiplexing section 113.

PDCCH generating section 104 generates the PDCCH signal to be transmitted in the downlink component carrier indicated by the configuration information (in particular, the PDCCH CC number) received from configuration section 101. This PDCCH signal includes the uplink resource allocation information and the downlink resource allocation information output from control section 103. Furthermore, PDCCH generating section 104 adds a CRC bit to the PDCCH signal and then masks (or scrambles) the CRC bit with a terminal ID. Then, PDCCH generating section 104 outputs the masked PDCCH signal to coding section 105.

The process described above is performed for each processing target terminal 200.

Coding section 105 performs a channel coding process on the PDCCH signal of each component carrier input from PDCCH generating section 104 and outputs the PDCCH signal that has been subjected to the channel coding process to modulation section 108.

Modulation section 108 modulates the PDCCH signal input from coding section 105 and outputs the modulated PDCCH signal to allocation section 111.

Allocation section 111 allocates the PDCCH signals of terminals input from modulation section 108, to CCEs inside of the search space of each terminal in each downlink component carrier. Allocation section 111 outputs the PDCCH signal allocated to the CCE to multiplexing section 113.

PCFICH generating section 112 generates a PCFICH signal to be transmitted every downlink component carrier, based on the CFI information every downlink component carrier input from control section 103. PCFICH generating section 112 then outputs the generated PCFICH signal to multiplexing section 113.

Coding section 106 encodes the configuration information input from configuration section 101 and outputs the encoded configuration information to modulating section 109.

Modulation section 109 modulates the encoded configuration information and outputs the modulated configuration information to multiplexing section 113.

Coding section 107 performs a channel coding process on the input transmission data (downlink data) and outputs the transmission data signal that has been subjected to the channel coding process to modulating section 110.

Modulation section 110 modulates the transmission data (downlink data) that has been subjected to the channel coding process and outputs the modulated transmission data signal to multiplexing section 113.

Multiplexing section 113 multiplexes the PDCCH signal input from allocation section 111, the PCFICH signal input from PCFICH generating section 112, the configuration information input from modulation section 109, and the data signal (that is, the PDSCH signal) input from modulation section 110. Here, based on the CFI information of each downlink component carrier input from control section 103, multiplexing section 113 determines the number of OFDM symbols to arrange the PDCCHs every downlink component carrier. Furthermore, multiplexing section 113 maps the PDCCH signal and the data signal (PDSCH signal) to each downlink component carrier, based on the downlink resource allocation information input from control section 103. Multiplexing section 113 may also map the configuration information to the PDSCH. Multiplexing section 113 then outputs a multiplexed signal to IFFT section 114.

IFFT section 114 converts the multiplexed signal input from multiplexing section 113 into a time domain waveform. CP adding section 115 then obtains an OFDM signal by adding a CP to this time domain waveform.

RF transmitting section 116 applies a radio transmission process (such as up-conversion and D/A conversion) on the OFDM signal input from CP adding section 115 and transmits the result via an antenna.

Meanwhile, RF receiving section 117 performs a radio reception process (such as down-conversion and A/D conversion) on the reception radio signal received in a reception band via the antenna and outputs the resulting received signal to CP removing section 118.

CP removing section 118 removes a CP from the received signal, and FFT section 119 converts the received signal from which the CP is removed into a frequency domain signal.

Extraction section 120 extracts the uplink data of each terminal and the PUCCH signal (e.g., ACK/NACK signal) from the frequency domain signal input from FFT section 119, based on the uplink resource allocation information (e.g., the uplink resource allocation information in four subframes ahead) input from control section 103. IDFT section 121 converts the signal extracted by extraction section 120 into a time domain signal and outputs the time domain signal to data receiving section 122.

Data receiving section 122 decodes uplink data out of the time domain signal input from IDFT section 121. Then, data receiving section 122 outputs the decoded uplink data as received data.

[Terminal Configuration]

Figure 3:
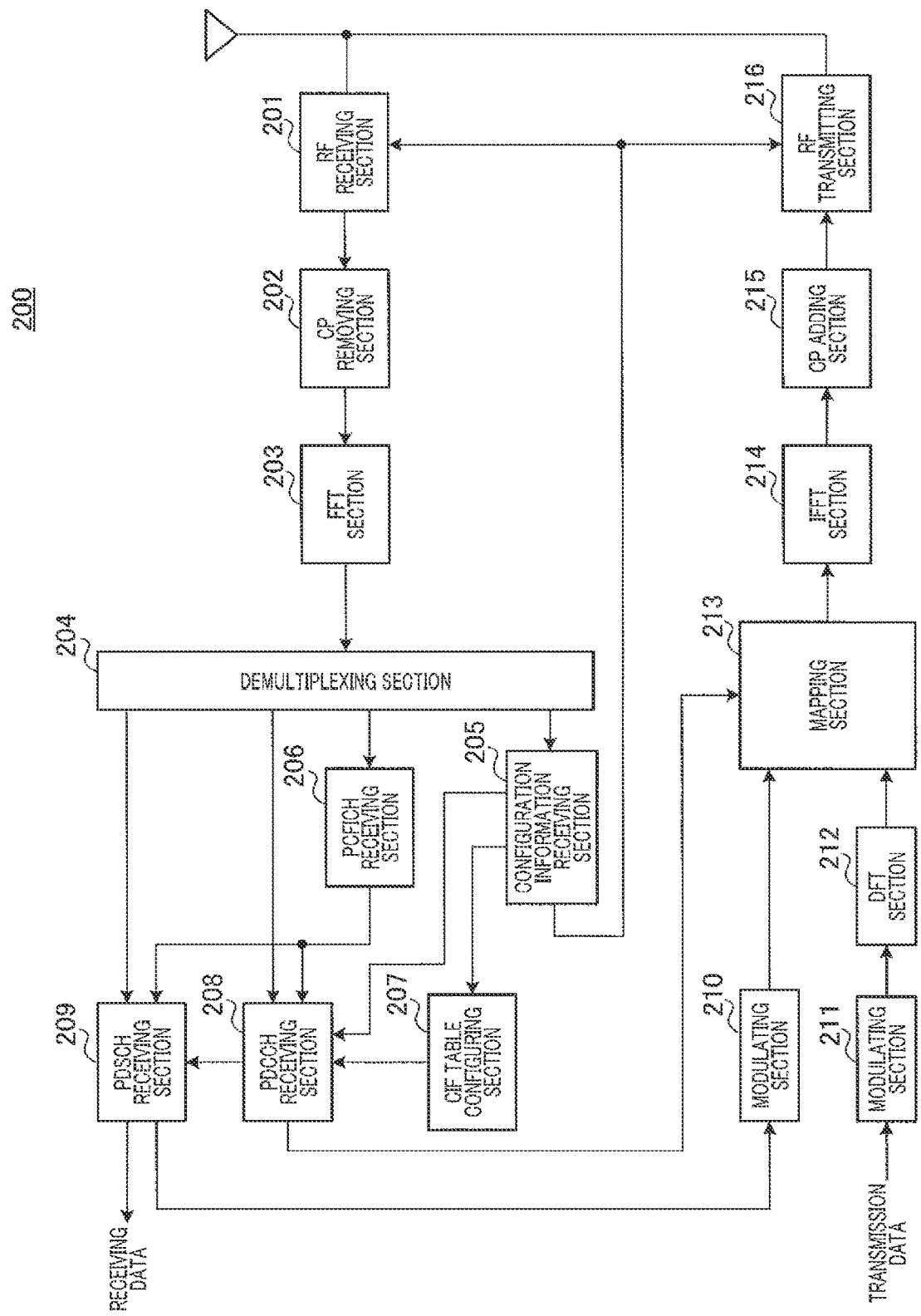
FIG. 3 is a block diagram illustrating a configuration of a terminal according to Embodiment 1 of the present invention.

FIG. 3 is a block diagram illustrating a configuration of terminal 200 according to Embodiment 1 of the present invention. Terminal 200 communicates with base station 100 by using a plurality of downlink component carriers. When the received data includes an error, terminal 200 stores the received data in an HARQ buffer, and at the time of retransmission, combines retransmission data with the received data stored in the HARQ buffer and decodes the resulting combined data.

In FIG. 3, terminal 200 includes RF receiving section 201, CP removing section 202, FFT section 203, demultiplexing section 204, configuration information receiving section 205, PCFICH receiving section 206, CIF table configuring section 207, PDCCH receiving section 208, PDSCH receiving section 209, modulating sections 210 and 211, DFT (Discrete Fourier Transform) section 212, mapping section 213, IFFT section 214, CP adding section 215, and RF transmitting section 216.

RF receiving section 201 is capable of changing a reception band, and changes the reception band, based on the band information input from configuration information receiving section 205. Then, RF receiving section 201 applies a radio reception process (such as, down-conversion and A/D conversion) to the reception radio signal (here, OFDM signal) received in the reception band via an antenna and outputs the resulting received signal to CP removing section 202.

CP removing section 202 removes a CP from the reception signal. FFT section 203 converts the received signal from which the CP is removed into a frequency domain signal and outputs this frequency domain signal to demultiplexing section 204.

Demultiplexing section 204 demultiplexes the signal input from FFT section 203 into a higher layer control signal (e.g., RRC signaling) including configuration information, a PCFICH signal, a PDCCH signal, and a data signal (i.e., PDSCH signal.) Then, demultiplexing section 204 outputs the control signal to configuration information receiving section 205, the PCFICH signal to PCFICH receiving section 206, the PDCCH signal to PDCCH receiving section 208, and the PDSCH signal to PDSCH receiving section 209.

Configuration information receiving section 205 reads the following information from the control signal received from demultiplexing section 204. That is, this read information means the information configured to the terminal, the information including: uplink component carrier and downlink component carrier for use in data transmission; information indicating a downlink component carrier for use in transmitting a PDCCH signal to which resource allocation information for each component carrier is allocated; and the CIF code point corresponding to an added or removed CC.

Configuration information receiving section 205 outputs the read information to CIF table configuring section 207, PDCCH receiving section 208, RF receiving section 201, and RF transmitting section 216. Furthermore, configuration information receiving section 205 reads the terminal ID configured to the terminal from the control signal received from demultiplexing section 204 and outputs the read information to PDCCH receiving section 208.

PCFICH receiving section 206 extracts the CFI information from the PCFICH signal received from demultiplexing section 204. That is, PCFICH receiving section 206 obtains the CFI information indicating the number of OFDM symbols used for the PDCCH to which the resource allocation information is allocated, for each of a plurality of downlink component carriers configured in the terminal. PCFICH receiving section 206 outputs the extracted CFI information to PDCCH receiving section 208 and PDSCH receiving section 209.

CIF table configuring section 207 corrects (updates) the CIF table held by PDCCH receiving section 208, based on an added or removed CC number received from configuration information receiving section 205 and the CIF code point allocated to the CC. This correction process corresponds to the correction process in base station 100.

PDCCH receiving section 208 performs blind decoding on the PDCCH signal received from demultiplexing section 204, to obtain the PDCCH signal (resource allocation information) addressed to the terminal. Here, the PDCCH signal is allocated to each CCE (i.e., PDCCH) arranged in the downlink component carrier configured to the terminal, the CCE indicated by the information received from configuration information receiving section 205.

To be more specific, for each downlink component carrier, PDCCH receiving section 208 specifies the number of OFDM symbols in which the PDCCH is arranged, based on the CFI information received from PCFICH receiving section 206. PDCCH receiving section 208 then calculates the search space of the terminal by using the terminal ID received from configuration information receiving section 205.

PDCCH receiving section 208 then demodulates and decodes the PDCCH signal allocated to each CCE in the calculated search space.

PDCCH receiving section 208 performs blind decoding on each PDCCH signal performing resource allocation of data of each component carrier. For example, when there are two component carriers (downlink component carrier 1 and downlink component carrier 2) and the PDCCH signals of both component carriers are transmitted from CC1, PDCCH receiving section 208 performs the blind decoding on the PDCCH signal performing data allocation of downlink component carrier 1 and blind decoding on the PDCCH signal performing data allocation of downlink component carrier 2, on CC1.

PDCCH receiving section 208 determines the decoded PDCCH signal as the signal addressed to the terminal, the decoded PDCCH signal resulting in CRC=OK (no error) after demasking a CRC bit using the terminal ID of the terminal indicated by the terminal ID information.

PDCCH receiving section 208 outputs the downlink resource allocation information included in the PDCCH signal addressed to the terminal to PDSCH receiving section 209, and outputs the uplink resource allocation information to mapping section 213. Meanwhile, when no PDCCH signal resulting in CRC=OK is detected, PDCCH receiving section 208 determines that the current subframe does not include data allocation addressed to the terminal and stands by until the next subframe.

Here, in the downlink resource allocation information included in the PDCCH signal, the CIF code point indicates the CC used for transmitting downlink data. Thus, with reference to the CIF table updated by CIF table configuring section 207, PDCCH receiving section 208 converts the CIF code point included in the downlink resource allocation information into a CC number and then outputs the downlink resource allocation information to PDSCH receiving section 209. Here, the CIF table is stored in the memory (not shown) included in PDCCH receiving section 208.

PDSCH receiving section 209 extracts the received data (downlink data) from the PDSCH signal received from demultiplexing section 204, based on the downlink resource allocation information and CFI information of a plurality of downlink component carriers received from PDCCH receiving section 208, and the CFI information of the CC where the PDCCH signal is transmitted, the CFI information received from PCFICH receiving section 206. Also, when the CC used to transmit the PDCCH signal is different from the CC used to transmit the PDSCH signal, the CFI information is obtained from the decoded PDCCH signal.

Furthermore, PDSCH receiving section 209 performs error detection on the extracted reception data (downlink data). As a result of the error detection, PDSCH receiving section 209 generates a NACK signal as an ACK/NACK signal when the reception data includes an error, whereas PDSCH receiving section 209 generates an ACK signal as the ACK/NACK signal when the reception data includes no error. Then, PDSCH receiving section 209 outputs the ACK/NACK signal to modulation section 210. When the reception data includes an error, PDSCH receiving section 209 stores the extracted reception data in an HARQ buffer (not shown). Upon receipt of retransmitted data, PDSCH receiving section 209 combines the previously-received data stored in the HARQ buffer with the retransmitted data and performs the error detection on the resulting combined signal. When base station 100 transmits the PDSCH signal using spatial multiplexing, for example, MIMO (Multiple-Input Multiple-Output) and thereby transmits two data blocks (Transport Blocks), PDSCH receiving section 209 generates ACK/NACK signals for the respective data blocks.

Modulation section 210 modulates the ACK/NACK signal received from PDSCH receiving section 209. When base station 100 transmits two data blocks by spatially-multiplexing the PDSCH signal in each downlink component carrier, modulation section 210 applies QPSK modulation on the ACK/NACK signal. Meanwhile, when base station 100 transmits one data block, modulation section 210 applies BPSK modulation on the ACK/NACK signal. That is, modulation section 210 generates one QPSK signal or BPSK signal as the ACK/NACK signal of each downlink component carrier. Modulation section 210 then outputs the modulated ACK/NACK signal to mapping section 213.

Modulation section 211 modulates transmission data (uplink data) and outputs the modulated data signal to DFT section 212.

DFT section 212 converts the data signal input from modulation section 211 into a frequency domain signal and outputs the resulting plurality of frequency components to mapping section 213.

Mapping section 213 maps the data signal input from DFT section 212 to the PUSCH arranged in the uplink component carrier, according to the uplink resource allocation information input from PDCCH receiving section 208. Mapping section 213 also maps the ACK/NACK signal input from modulation section 210 onto the PUCCH arranged in the uplink component carrier.

Here, modulation sections 210 and 211, DFT section 212, and mapping section 213 may also be provided every uplink component carrier.

IFFT section 214 converts a plurality of frequency components mapped to the PUSCH into a time-domain waveform, and CP adding section 215 adds a CP to the time-domain waveform.

RF transmitting section 216 is capable of changing a transmission band, and configures the transmission band, based on the band information received from configuration information receiving section 205. Then, RF transmitting section 216 applies a radio transmission process (such as, up-conversion and D/A conversion) to the signal to which the CP is added, to transmit the result via an antenna.

[Operations of Base Station 100 and Terminal 200]

Operations of base station 100 and terminal 200 having the above mentioned configurations will be described. Here, in particular, the process to correct a CIF table will be explained, the process being performed for a change in a UE CC set.

Figure 4:
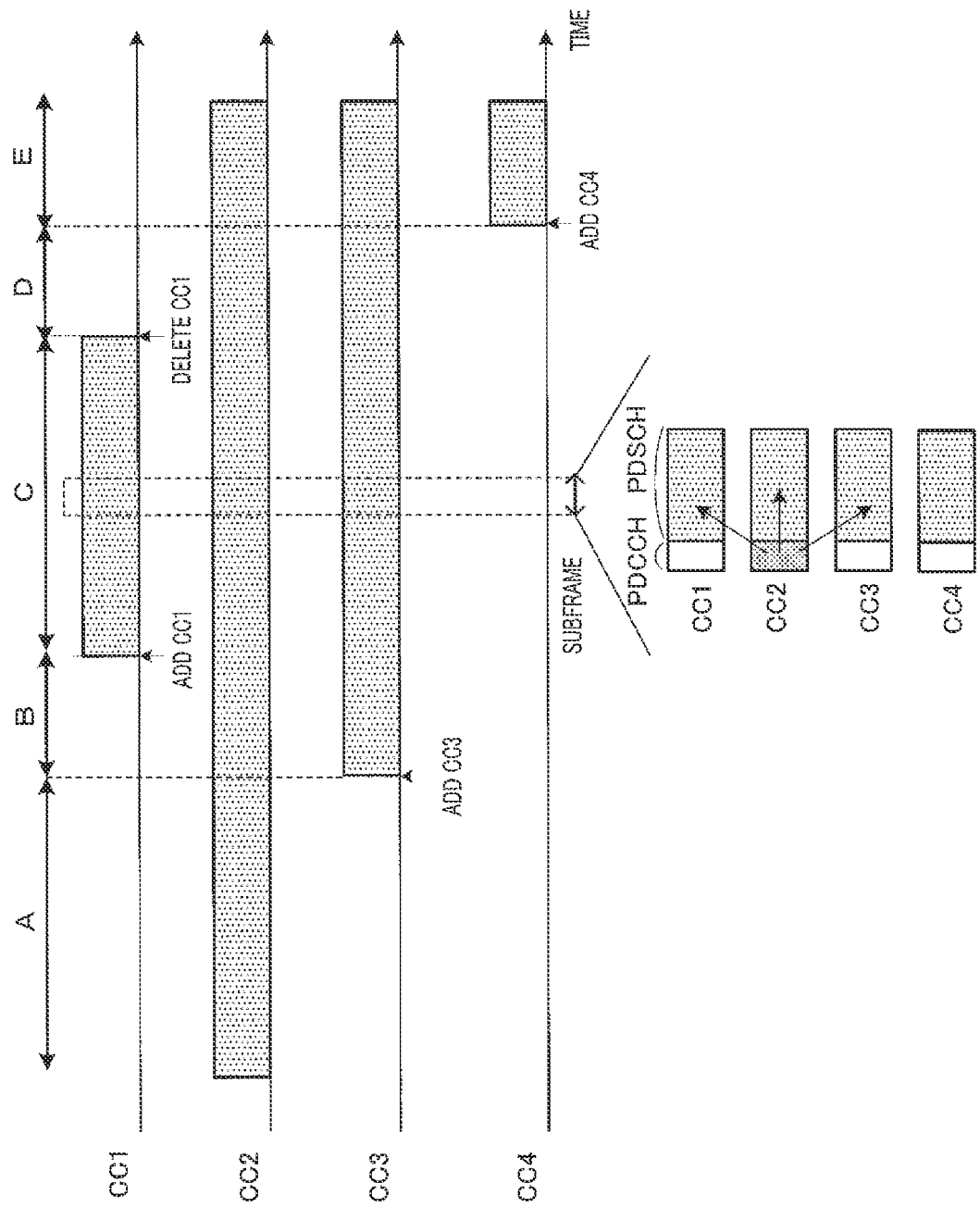
FIG. 4 illustrates operation of the base station and the terminal.

FIG. 4 illustrates how CCs forming a UE CC set vary with time. FIG. 5 illustrates the conditions of the CIF table in time intervals illustrated in FIG. 4. When the CIF consists of two bits, there are four code points represented by bit sequences 00, 01, 10, and 11, respectively. Here, a case will be described assuming that CIs=1, 2, 3, and 4 correspond to the bit sequences 00, 01, 10, and 11, respectively.

As illustrated in FIG. 4, when the power of terminal 200 is turned on, terminal 200 starts to communicate with base station 100 in one CC (in FIG. 4, CC2) according to operations such as a cell search and random access as in LTE.

Base station 100 then adds a CC to terminal 200 due to, for example, increase of the amount of data. Here, configuration section 101 corrects (updates) the CIF table stored in memory 102 in base station 100. To be more specific, when adding a new CC to the UE CC set, configuration section 101 adds the new CC while maintaining the CCs forming the currently configured UE CC set. In the correction of the CIF table, configuration section 101 allocates the currently unused CIF code point to the added CC, while maintaining the relationship between the CIF code points and the CCs forming currently configured UE CC set. Configuration section 101 also allocates "PDCCH CC number."

For example, in FIG. 4, CCs are added at the start timings of intervals B, C, and E, respectively. The conditions of the CIF tables in the intervals B, C, and E are illustrated in FIGS. 5B, C, and E, respectively. For example, CC1 is added between FIG. 5B and FIG. 5C. In FIG. 5C, CC1 is associated with CIF code point 3 unused in FIG. 5B, while the relationship between the CCs forming the UE CC set and the CIF code point in FIG. 5B is maintained.

As illustrated in FIG. 4, in interval C, the information of data (PDSCH) allocation in CC1, 2, and 3 is notified to terminal 200 by the PDCCH of CC2. That is, "PDCCH CC number" is 2 at this time.

Also, when deleting a CC from the CCs forming the UE CC set, configuration section 101 deletes only the CC, while maintaining the correspondence between the CIF code points and the CCs not to be deleted.

For example, CC1 is deleted between FIG. 5C and FIG. 5D. In FIG. 5D, the correspondence between the CIF code points and CCs 2 and 3 other than CC1 in FIG. 5C is maintained.

The correction process by CIF table configuring section 207 of terminal 200 corresponds to the correction process in base station 100.

As described above, even when the CIF table is changed in association with the change of the UE CC set (that is, addition or deletion of a CC), the correspondence between the CIF code points and CCs unrelated to the change is maintained. That is, it is possible to allocate data to the CCs unrelated to the change by using the previously allocated code points as is, even during an RRC connection reconfiguration procedure required on changing the UE CC set. By this means, it is possible to prevent a delay in data transmission. Also, the usage of more CCs can improve the data throughput.

Furthermore, since the CIF code points are allocated only to the CCs actually configured to terminal 200, the number of bits required for notifying terminal 200 of the CCs from base station 100 can be only the number of CCs supported by terminal 200. For example, even in case of a system supporting eight CCs, the number of bits required for notifying terminal 200 of the CCs from base station 100 can be only two bits when the number of CCs supported by terminal 200 is four. That is, even when the number of CCs in the entire system increases, there is no need to increase the number of CIF bits and hence it is possible to reduce the amount of control information.

According to the present embodiment described above, in base station 100, when adding a component carrier to a component carriers set (UE CC set), configuration section 101 corrects the CIF table associating the identification information of the component carriers with the code points used as the labels of the component carriers included in the UE CC set, and then allocates an unused code point to the component carrier to be added, while maintaining the correspondence between the identification information of the component carriers and the code points in the state before the CIF table is corrected. Control section 103 forms control signals (PDCCHs) related to data transmission using a plurality of component carriers, respectively, and the control signals of the respective component carriers are labeled by the code points according to the CIF table corrected by configuration section 101. The transmission section including configuration section 101, coding section 106, and modulating section 109 transmits a notification signal including the information related to the correction of the CIF table to terminal 200.

As a result, it is possible to suppress the number of bits required for notification of the CCs in use and also to prevent the delay in the data transmission.

In addition, the CIF table in memory 102 may be maintained every CC used to transmit a PDCCH. That is, in case of adding a CC, the CIF table of the allocated PDCCH CC is corrected. For example, since CC2 is allocated as a PDCCH CC, the CIF table of CC2 is corrected in the above example. As another example, let us consider a case where CC2 is configured as the PDCCH CC for both CC2 and CC3 in the UE CC set (that is, the state of FIG. 4B). Here, in case of adding CC1 and CC4, CC1 may be configured as the PDCCH CC of CC1 and CC4, and CIF code points 1 and 2 may be allocated to CC1 and CC4. In this case, the CIF table of CC1 is corrected. In a case where the CIF table is maintained every CC as above, allocation of the same CIF code point numbers is possible when the PDCCH CCs are different. Thus, the number of CIF bits required for CC notification can be reduced.

Embodiment 2

In Embodiment 2, the CIF code point reports a CFI value in addition to the CC number which is the target of the data allocation. That is, in the CIF table, the pair of the CC number and the CFI value is associated with the CIF code point. Here, the CFI value at the top of the subframe is transmitted to all terminals from each of the CCs by a PCFICH (Physical Control Format Indicator Channel). In a heterogeneous network environment where a macrocell and a femtocell exist, the PCFICH may not be received with sufficient reliability. In such an environment, it is possible to increase the reliability in CFI notification, by including the CFI value related to a certain CC in a PDCCH signal transmitted from another CC.

The basic configurations of a base station and a terminal according to Embodiment 2 are common to Embodiment 1, and will therefore be described using FIGS. 2 and 3.

When adding a CC, configuration section 101 of base station 100 according to Embodiment 2 basically allocates pairs each including the CC to be added and a corresponding one of all CFI values to different CIF code points, respectively. Also in Embodiment 2, configuration section 101 basically allocates a currently unused CIF code point to the added CC, while maintaining the relationship between the CIF code points and the CCs forming the currently configured UE CC set. When deleting a CC from the CCs forming the UE CC set, configuration section 101 deletes only the CC, while maintaining the correspondence between the CIF code points and the CCs not to be deleted. At this time, the correspondence related to the CC to be deleted is all deleted.

Also, CIF table configuring section 207 of terminal 200 corrects (updates) the CIF table held by PDCCH receiving section 208, based on the added or deleted CC number received from configuration information receiving section 205, the CIF code point and the CFI value allocated to the CC.

Operations of base station 100 and terminal 200 having the above mentioned configurations will be described.

In the present embodiment, base station 100 and terminal 200 share the table representing the relationship of the CIF code points, the CC numbers, and the CFI values. In case of adding a CC, up to three CIF code points corresponding to CFIs=1, 2, and 3 are allocated, and then the information related to the allocated CIF code points is notified to terminal 200 from base station 100. When the number of configured CCs is large, the number of CFI values that can be notified for the added CCs may be two or one. Thus, when notifying terminal 200 of the information related to the CC in case of adding a CC, base station 100 also notifies terminal 200 of the number of allocated code points. This notification format is illustrated in FIG. 7.

FIG. 6 illustrates how the CIF table varies when CCs are added. In particular, FIG. 6 illustrates how the CIF table varies when CC1 and CC4 are sequentially added to terminal 200 performing communication using CC2 and CC3. Here, it is assumed that the CC used to transmit a PDCCH is CC2.

As illustrated in FIG. 6, when adding CC1, configuration section 101 allocates the pairs each including the CC to be added and a corresponding one of all CFI values to different CIF code points, respectively. That is, since CFIs=1, 2, and 3 are prepared here, different CIF code points are allocated to the three pairs of CC1 and CFIs=1, 2, and 3, respectively. In the state of FIG. 6A, since CIF code points 5 to 8 are unused, three of these CIF code points are allocated to the three pairs of CC1 and CFIs=1, 2, and 3, respectively. Here, in particular, the CIF code point with a smaller number is preferentially allocated in ascending order.

As illustrated in FIG. 6C, when adding CC4, configuration section 101 allocates the pairs each including the CC to be added and a corresponding one of all CFI values to different CIF code points, respectively. Here, the pair of CC4 and CFI=2 is allocated to CIF code point 8 which is unused. Meanwhile, instead of the pair of CC3 and CFI=3, the pair of CC4 and CFI=1 is allocated to CIF code point 4 which has been previously allocated to the pair of CC3 and CFI=3. That is, the pair of CC3 and CFI=3 is overwritten by the pair of CC4 and CFI=1.

That is, depending on conditions, configuration section 101 may allocate the pairs each including the CC to be added and a corresponding one of some CFI values to different CIF code points, respectively.

Configuration section 101 can select which CIF code point corresponding to a CFI value to overwrite, from a plurality of CIF code points allocated to any CC. That is, while the pair of CC3 and CFI=3 is overwritten in FIG. 6C, the pair of CC3 and CFI=1 or the pair of CC3 and CFI=2 may be overwritten instead.

Configuration section 101 can also select which pair to allocate to the CIF code point, from the pairs each including the CC to be added and a corresponding one of all the CFI values. That is, while two pairs of CC4 and CFIs=1 and 2 are selected from three pairs of CC4 and CFIs=1, 2, and 3 in FIG. 6C, two pairs of CC4 and CFIs=2 and 3 may be selected or two pairs of CC4 and CFIs=1 and 3 may be selected instead. The pair actually allocated to the CIF code point is selected according to, for example, the cell environment. For example, since a cell with a large cell radius (for example, macrocell) accommodates a large number of terminals, many PDCCH resources are often required. Thus, a large value (for example, 2 or 3) is preferable as the CFI value representing a PDCCH resource region. In contrast, since the cell with a small cell radius (for example, picocell and femtocell) accommodates a small number of terminals, the CFI value representing the PDCCH resource region may be small. Thus, 1 or 2, for example, is selected as the CFI value in this case. In a cell such as a hotspot where the number of terminals increases or decreases drastically, 1 or 3 may be selected as the CFI value. Then, the information related to the selected pair is separately notified.

FIG. 7 illustrates the notification formats of the CIF code points. In FIG. 7, the upper part illustrates a format to report three CIF code points, the middle part illustrates a format to report two CIF code points, and the lower part illustrates a format to report one CIF code point.

As illustrated in FIG. 7, each format provides the same number of regions to store the CIF code points as the number of CFI values required to be notified. Furthermore, each storage region is associated with a different CFI value. This storage region may be referred to as "notification field."

As described above, even when the CIF table is changed in association with a change in the UE CC set (that is, addition or deletion of a CC), the correspondence between the CIF code points and the CCs unrelated to the change is maintained. Even when a pair related to a previously allocated CC is overwritten, only some of the pairs related to the CC is overwritten, so that the CIF code points of the pairs not overwritten are maintained.

That is, it is possible to allocate data to the pairs unrelated to the change by using the previously allocated code points as is, even during an RRC connection reconfiguration procedure required on changing the UE CC set. By this means, it is possible to prevent the delay in the data transmission.

By selecting the code point to overwrite according to the necessary CFI value, it is possible to select the CFI value likely to be used according to a cell environment, for example. Also, configuring the CFI value in association with the CC in case of adding the CC makes it possible to configure the CFI value according to the cell environment, for example.

When deleting CC4 from the state of FIG. 6C, it is possible to separately allocate CIF code point 4 to the pair of CC3 and CFI=3, or to automatically return to the table of FIG. 6B which is the previous state. By this means, when the number of CCs included in the UE CC set decreases, it is possible to set three CFI values to be reportable, without separately reporting the CIF code point.

Here, there are some variations of the technique for notifying terminal 200 of pairs in case of allocating only pairs of the CC to be added and some of the CFI values to CIF code points.

(Variation 1)

Figure 8:
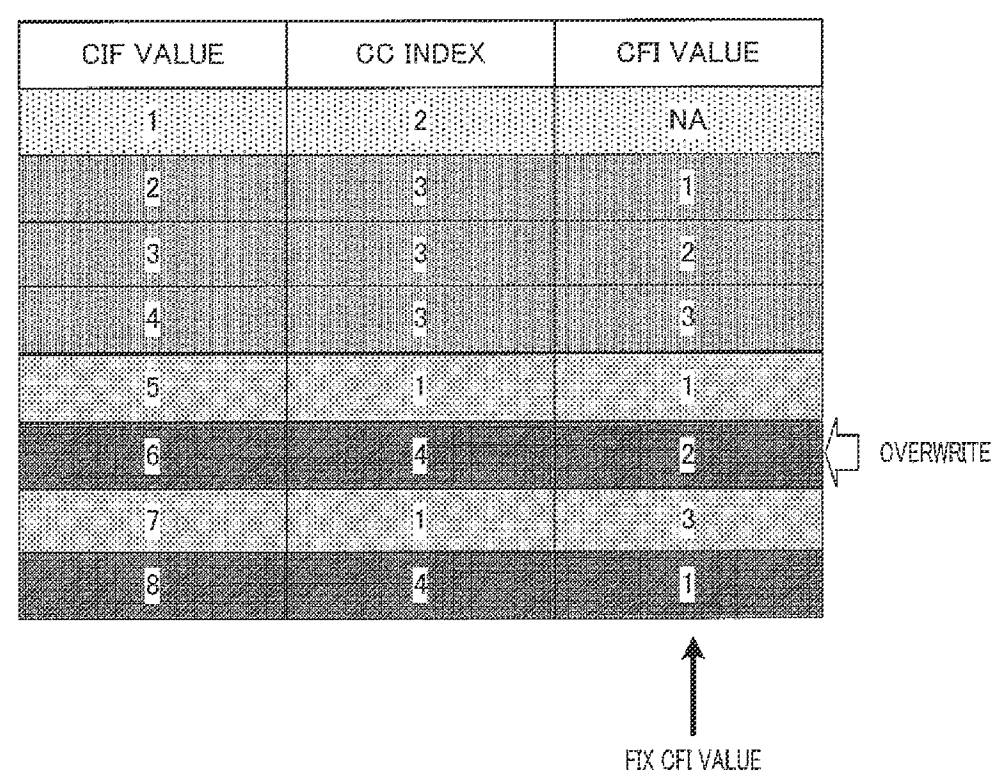

In variation 1, the CIF table associates the CIF code points with the CFI values, respectively, in advance. That is, in the example of FIG. 8, the CFI values are fixedly allocated to CIF code points 2 to 8, respectively.

Thus, once the CFI value to be used is determined, the candidate usable CIF code points are narrowed down. Thus, the selection process of configuration section 101 can be simplified. Also, when base station 100 notifies terminal 200 of a CIF code point, the corresponding CFI value is specified. For this reason, base station 100 need not separately notify terminal 200 of the CFI value.

(Variation 2)

Variation 2 uses a notification format capable of storing a larger number of CIF code points than the number of actually required CFI values. Here, for ease of explanation, a case to use the notification format of the upper part in FIG. 7.

Here, when only two out of three CFI values are allocated to additional CCs, it is notified as follows.

That is, in a case where three notification fields included in the notification format report CIF code points=2, 2, and 3, respectively, this means that the CFI values corresponding to CIF code points=2 and 3 are 1 and 3, respectively. Also, in a case where the three notification fields report CIF code points=2, 3, and 3, respectively, this means that the CFI values corresponding to CIF code points=2 and 3 are 1 and 2, respectively. Also, in a case where the three notification fields report CIF code points=2, 3, and 2, respectively, this means that the CFI values corresponding to CIF code points=2 and 3 are 2 and 3, respectively. To put it more specifically, the mapping patterns of the CIF code points to a plurality of notification fields are associated with the combinations of a plurality of CFI values.

By this means, it is possible to report the CFI value to be actually used, without additional signaling to report which CFI value is used.

(Variation 3)

Variation 3 uses a notification format capable of storing the same number of CIF code points as the maximum number of CFI values. Here, for ease of explanation, an explanation will be given of a case where the notification format shown in the upper part of FIG. 7 is used.

Here, when only two out of three CFI values are allocated to the additional CCs, it is notified as follows.

For example, when two CIF code points 6 and 8 are to be associated with CFIs=2 and 3, respectively, three notification fields store CIF code points=1, 6, and 8, respectively. Here, when the added CC and the CC used to transmit a PDCCH are the same, CIF=1 is used as a rule regardless of the notification content of the CIF code point. By this means, when CIF=1 is stored in a notification format, this CIF code point can be treated as invalid. Thus, as described above, when three notification fields store CIF code points=1, 6, and 8, respectively, only CIF code points 6 and 8 are valid. Thus, CFI values=2 and 3 corresponding to the fields storing those code points, respectively, can be notified.

By this means, it is possible to report a CFI value to be actually used, without additional signaling to report which CFI value is used.

Embodiment 3

Embodiment 3 defines a plurality of CIF tables with different numbers of code points usable per CC, and configures in advance which table to use every terminal. By this means, it is possible to use the CIF table appropriate for the reception capability (UE capability) of each terminal, the communication status of each terminal, and the cell environment.

The basic configurations of a base station and a terminal according to Embodiment 3 are common to Embodiment 1, and will therefore be described using FIGS. 2 and 3.

Memory 102 of base station 100 according to Embodiment 3 stores a group of CIF table formats. FIG. 9 illustrates an example of the group of the CIF table formats. As illustrated in FIG. 9, each of the CIF table formats includes a plurality of subsets. This subset is a unit to be allocated to one CC. Each subset includes one or a plurality of CIF code points. Also, the CIF table formats differ each other in at least one of the number of CIF code points included in the subsets (in other words, the number of subsets included in each CIF table), and the combination of the CFI values included in a subset.

For each terminal 200, configuration section 101 selects and configures which table format to use from a plurality of CIF table formats stored in memory 102. The information of this configured CIF table format is notified to terminal 200 as configuration information. This table format is configured and notified to terminal 200 when terminal 200 transitions from an idle mode to an active mode to start communication or when a radio bearer is established. That is, the configuration or notification of the table format is set in a longer interval than a change in the UE CC set.

When adding a CC to terminal 200, configuration section 101 notifies terminal 200 of the subset number of the CIF table format that is configured in advance every terminal 200 and that is allocated to the CC to be added. By this means, terminal 200 can associate the additional CC with all CIF code points included in the notified subset number.

CIF table configuring section 207 of terminal 200 according to Embodiment 3 configures the table format notified from the base station in PDCCH receiving section 208. Also, CIF table configuring section 207 updates the CIF table by the subset number notified in case of CC addition.

Operations of base station 100 and terminal 200 having the above mentioned configurations will be described referring to FIG. 9.

As illustrated in FIG. 9, each CIF table format includes a plurality of subsets. A CIF code point is allocated to the subsets, by defining one or a plurality of CIF code points as an allocation unit. In table format 1, each subset includes three CIF code points. In each of table formats 2 to 4, basically, each subset includes two CIF code points.

Also, the CIF table formats differ each other in at least one of the number of CIF code points included in the subsets (in other words, the number of subsets included in each CIF table), and the combination of the CFI values included in a subset. That is, table format 1 differs from table formats 2 to 4, in the number of the CIF code points included in the subsets. Also, table formats 2 to 4 differ each other in the combination of CFI values included in the subsets. That is, in table format 2, the combination of the CFI values included in the subsets is 1 and 2, while the combination of the CFI values included in the subsets is 2 and 3 in table format 3, and the combination of the CFI values included in the subsets is 1 and 3 in table format 4.

In each table format, the subset including CIF=8 includes only one CIF. For CIF=8, the largest CFI value is selected and configured from CFI values allocatable for each table format. That is, as the CFI value, 2, 3 and 3 are respectively configured in table formats 2, 3 and 4. The reason for the above configurations is as follows. That is, even when the number of OFDM symbols in the control channel region of a certain CC is lower than the CFI value reportable by a table format configured in a certain terminal 200, as long as the first OFDM symbol to which a data signal (PDSCH) addressed to the terminal 200 is mapped, corresponds to the value notified by CFI, it is possible to prevent the control channel and the data signal from overlapping each other. Meanwhile, when a small CFI value is configured in CIF=8, the number of OFDM symbols in a control channel region of a certain CC often exceeds the CFI value configured in CIF=8. As a result, the control channel and the data signal overlap each other in this case. Thus, one of channels may not be able to be transmitted. In view of the above, for CIF=8, the largest CFI value is selected and configured from the CFI values allocatable in each table format.

For each terminal 200, configuration section 101 selects and configures which table format to use, from a plurality of CIF table formats stored in memory 102, and then notifies each terminal 200 of the configuration information.

Configuration section 101 configures table format 1 for the terminal capable of receiving signals using up to three CCs, and configures table formats 2 to 4 for the terminal capable of receiving signals using equal to or more than four CCs. Also, configuration section 101 configures table formats 2 to 4 which can configure a large number of CCs (that is, a large number of included subsets), for the terminal with the requirement of high speed transmission, and configures table 1 for the terminal without the requirement of high speed transmission.

Also, configuration section 101 can configure the table format on a cell unit basis. For example, configuration section 101 assigns and configures table formats 2 to 4 for each terminal in a cell operated with a large number of CCs causing other CCs to perform data allocation notification, and assigns and configures table format 1 in a cell operated with a small number of CCs causing other CC to perform data allocation notification.

In a cell with a large cell radius, configuration section 101 configures a table format in which a large CFI value is allocated to each subset. That is, the cell with a large cell radius (for example, macrocell) accommodates a large number of terminals. For this reason, many PDCCH resources are often required. Thus, the table format in which a large CFI value (for example, 2 and 3) is allocated to each subset is configured in such a cell.

In contrast, in a cell with a small cell radius, configuration section 101 configures a table format in which a small CFI value is allocated to each subset. That is, the cell with a small cell radius (for example, pico cell or femtocell) accommodates a small number of terminals. For this reason, the required amount of PDCCH resource region is small in many cases. Thus, the table format in which a small CFI value (for example, 1 and 2) is allocated to each subset is configured in such a cell.

In a cell where the number of terminals increases or decreases drastically (for example, a hotspot), configuration section 101 configures the table format in which both a large CFI value and a small CFI value (for example, 1 and 3) are allocated to each subset.

As described above, for each terminal 200, configuration section 101 selects and configures which table format to use, from a plurality of CIF table formats stored in memory 102. Also, a plurality of the CIF table formats stored in memory 102 differ each other in at least one of the number of CIF code points included in the subsets (in other words, the number of subsets included in each CIF table), and the combination of the CFI values included in a subset.

Accordingly, when adding a CC, configuration section 101 only has to notify each terminal 200 of a subset number. Thus, it is possible to reduce the number of bits used for notification. Defining the table format in advance limits the combination of a plurality of CIF code points used for allocation to a certain CC. By this means, it is possible to simplify a system and a terminal and also to reduce the amount of work for testing the system and the terminal.

Table format 5 as illustrated in FIG. 10 may be defined in advance in memory 102. That is, the combination of CFI values differs every subset in this type of table format. This type of table format is useful as the table format capable of allocating four CCs or five CCs.

Here, table format 1 is described as a format for three CCs and table formats 2 to 4 are each described as a format for four CCs or five CCs in FIG. 9. It is, however, possible to separately define, as a format for four CCs, the table format in which subset 1 includes CIFs=2, 3, and 4, subset 2 includes CIFs=5 and 6, and subset 3 includes CIFs=7 and 8. By this means, it is possible to maximize the number of CFIs that can be notified every CC.

OTHER EMBODIMENTS (1) The above embodiments have explained that a PDCCH of each CC is used to report a CFI of the CC, while a PDCCH of a certain CC is used to report a CFI of another CC. However, the present invention is not limited to this, and the PDCCH of each CC may not need to report the CFI of the CC. That is, the configuration in which only the PDCCH of a certain CC reports the CFI of another CC is also possible. In this case, when a CC used to transmit a PDCCH including information of a CC to be added at the moment of CC addition is the same as the CC to be added, terminal 200 considers that the PDCCH does not include any CIF and thus determines that no CIF code point is notified or that the CIF code point is notified, but the allocation is invalid. Meanwhile, when the CC used to transmit the PDCCH including the information of the CC at the moment of CC addition is different from the CC to be added, terminal 200 considers that the PDCCH includes a CIF and thus determines that the CIF code point is notified. In this case, there is no need to separately report the information indicating whether or not the CIF is included, every PDCCH. Also, even in the system performing operations with a CIF and without the CIF every CC, when adding a CC to a UE CC set, terminal 200 only needs to determine whether the CC to be added performs CIF notification or the CC different from the CC to be added performs the CIF notification. Here, terminal 200 only has to operate commonly in both cases. Thus, it is possible to simplify the system and the terminal.

(2) The above embodiments have explained that RRC signaling is performed at addition or deletion of the UE CC set. However, the present invention is not limited to this and is applicable even when more dynamic control than RRC signaling is performed. For example, it is also possible to designate the CIF code point even when a MAC header or a PDCCH reports the addition or deletion of the CC (that is, CC activation/deactivation).

(3) The above embodiments have explained that one PDCCH is transmitted per CC. However, the present invention is not limited to this, and two or more PDCCHs may be transmitted per CC. In case of this configuration, at the addition of a CC, CIF code points are allocated to two ore more PDCCH CCs included in one CC.

(4) The above embodiments have explained that CFI indicates a control channel region. However, the present invention is not limited to this, and the CFI may be the information indicating the first OFDM symbol to which data is mapped. For example, while CFI=2 holds true in a certain CC (that is, up to two OFDM symbols are used for control channel), the first OFDM symbol number to which data for a certain terminal 200 is mapped may be 4. For example, even in a case where only CFI=3 can be notified to a certain terminal 200 in a certain CC, it is possible to configure a small control channel region (for example, two OFDM symbols) when the amount of control channel of the CC is small.

(5) Although a case where the number of bits in the CIF is 2 bits and 3 bits has been described in the above, another number of bits is also possible. Also, a case where a cell or a terminal uses a different number of bits may be possible.

(6) Although an example to report the CI and CFI in the CIF has been described in the above, the present invention is applicable for reporting information other than the CFI.

(7) Although the above embodiments have described allocation of downlink CC, the techniques described in embodiments are also applicable for allocation of uplink CC. Also, a CC may be added or deleted in a pair of uplink and downlink, or may be added or deleted in uplink and downlink separately.

(8) The above described UE CC set may be referred to as "UE DL CC set" for a downlink CC and "UE UL CC set" for an uplink CC.

(9) The above mentioned PDCCH format may be referred to as "DCI (Downlink Control Information) format."

(10) The above mentioned "carrier aggregation" may also be referred to as "band aggregation." Furthermore, discontinuous frequency bands may be aggregated in the carrier aggregation.

(11) Although the above mentioned "component carrier" has been defined as the band having a width of maximum 20 MHz and the basic unit of communication bands, the component carrier may be defined as follows. A "component carrier" in downlink (hereinafter referred to as "downlink component carrier") may be defined as the band divided by downlink frequency band information in the BCH broadcasted from a base station, or the band defined by a bandwidth where a physical downlink control channel (PDCCH) is placed in the frequency domain in a distributed manner. Also, a "component carrier" in uplink (hereinafter referred to as "uplink component carrier") may be defined as the band divided by uplink frequency band information in the BCH broadcasted from a base station, or the reference unit in the communication band which is equal to or below 20 MHz and includes a PUCCH near the center and PUCCHs at both end parts. Also, in 3GPP LTE, "component carrier(s) (CC)" may be expressed as "Component Carrier(s)" in English. Also, "component carrier(s)" may be referred to as "component band(s)." Furthermore, "Component Carrier"

may be defined by a physical cell number and a carrier frequency number, and may be referred to as "cell."

(12) The PDCCH may be set to be always transmitted by the primary component carrier. Here, the primary component carrier may be the component carrier determined by a system (for example, the component carrier used for transmitting an SCH or PBCH), a common component carrier among terminals 200 may be set for each cell, or a different component carrier may be set for each terminal 200.

(13) Although the above embodiments have described an example where the present invention is implemented with hardware, the present invention can be implemented with software.

Furthermore, each function block employed in the explanation of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Furthermore, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Furthermore, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2010-030267, filed on Feb. 15, 2010, including the specification, drawings and abstract, is incorporated herein by reference in its entirety.

INDUSTRIAL APPLICABILITY

The transmission apparatus and the transmission method of the present invention are useful as an apparatus and a method capable of preventing, when adding a CC to be used in carrier aggregation communication, a delay in data transmission while suppressing an increase in the number of bits required for notification of the CCs in use.

REFERENCE SIGNS LIST

100 Base station
101 Configuration section
102 Memory
103 Control section
104 PDCCH generating section
105, 106, 107 Coding section
108, 109, 110, 210, 211 Modulating section
111 Allocation section
112 PCFICH generating section
113 Multiplexing section
114, 214 IFFT section
115, 215 CP adding section
116, 216 RF transmitting section
117, 201 RF receiving section
118, 202 CP removing section
119, 203 FFT section
120 Extraction section
121 IDFT section
122 Data receiving section
200 Terminal
204 Demultiplexing section
205 Configuration information receiving section
206 PCFICH receiving section
207 CIF table configuring section
208 PDCCH receiving section
209 PDSCH receiving section
212 DFT section
213 Mapping section

The invention claimed is:

1. An integrated circuit, comprising:
reception circuitry, which, in operation, controls receiving configuration information;
addition circuitry, which, in operation, controls adding a first component carrier (CC) based on the configuration information;
wherein
the first CC is identified based on the configuration information,
the first CC is related to a second CC based on the configuration information, the second CC used for a transmission of physical downlink control information (PDCCH) indicating a resource allocation information for data transmitted in the first CC,
the first CC is related to a carrier indicator field (CIF) value used for a cross carrier scheduling based on the configuration information, and
when the first CC related to the CIF value is added, a relation between other CCs and other CIF values is maintained.

2. The integrated circuit according to claim 1, wherein the first CC related to the CIF value is deleted based on the configuration information indicating a deletion of the first CC.

3. The integrated circuit according to claim 1, wherein when the first CC related to the CIF value is deleted, a relation between other CCs and other CIF values is maintained.

* * * * *